3,219,630
**PRODUCTION OF BRANCHED CHAIN POLYOXY-
METHYLENE POLYCARBOXYLATES**
Henri Sidi, Paramus, N.J., assignor, by mesne assignments,
to Tenneco Chemicals, Inc., a corporation of Delaware
No Drawing. Filed Aug. 25, 1961, Ser. No. 133,783
7 Claims. (Cl. 260—67)

This invention relates to a process for the production of high molecular weight polymers of formaldehyde. More particularly it relates to a process for the production of formaldehyde polymers having a high degree of thermal stability.

It is well known that formaldehyde can be polymerized to form high molecular weight polyoxymethylene glycols, which, upon stabilization, can be made tough, flexible films or other articles. Since the "uncapped" polymers degrade rapidly when heated at elevated temperatures, it is desirable for many uses that the thermal stability of these polymers be increased. It has been proposed that polyoxymethylene glycols be stabilized by treatment with anhydrides of carboxylic acids, hydrazines, substituted alkylene diamines, secondary or tertiary monomeric aromatic amines, ureas, thioureas, phenols, and the like. In each such case the stabilized polymer is obtained by polymerizing formaldehyde to form high molecular weight polyoxymethylene glycol, isolating the polymer so formed, and thereafter treating the polymer with the stabilizing agent. To obtain a product having good thermal stability, it is often necessary to dissolve the polyoxymethylene in a solvent or in the stabilizing agent by heating it at elevated temperautres and/or at superatmospheric pressures before effecting the stabilization reaction. These previously-employed stabilization procedures are usually inefficient and time-consuming and may result in some degradation of the polymer.

The present invention is based upon the discovery that formaldehyde (or trioxane) may be polymerized in an alkylene dicarboxylate reaction medium in which there is dissolved or suspended a catalytic amount of a polymerization initiator to form a partially acylated polyoxymethylene polyol, which, in turn, may be completely acylated without removal from the reaction medium merely by heating the system. Thus, the invention provides an improved process for producing polyoxymethylene polycarboxylates in which formaldehyde is polymerized in the presence of an alkylene dicarboxylate reaction medium, and the resultant partially acylated polyoxymethylene polyol is completely esterified in situ by subsequently heating the reaction medium.

The use of an alkylene dicarboxylate as the reaction medium appears to influence the molecular configuration of the resultant polymer by introducing branched chains at one or more points in the main polymer chain. For example, when substantially anhydrous monomeric formaldehyde is polymerized by contacting the monomer with a reaction medium comprising methylene diacetate in which there is dissolved a polymerization initiator, and the resultant partially acetylated polymer is "capped" by adding acetic anhydride to the reaction medium, thereby forming a polyoxymethylene polyacetate, viscometric determination of the molecular weight yields values which are higher than the molecular weights computed from the infrared absorption in the carbonyl region, assuming the polymer to be linear and hence an $\alpha,\omega$-diacetate. Thus, if there are more than two acetate groups per molecule, then the molecular weight which is computed from infrared absorption should be lower than the viscosimetrically determined molecular weight for the same polymer. It appears, from all experiments to date that the homopolymer polyoxymethylene polycarboxylates produced in accordance with the process of the invention contain from 1 to 3 branches per polymer molecule, although this data is not conclusive. Comparable molecular weight determinations on a commercially available polyoxymethylene diacetate have confirmed that this commercially available product is linear and contains only two acetate groups per molecule.

As used herein, the term "high molecular weight polyoxymethylene" relates to polymers having recurring —$CH_2O$— units and having molecular weights between approximately 5,000 and 200,000 and preferably between approximately 15,000 and 60,000. The unstabilized polyoxymethylenes are those having the formula $HO(CH_2O)_nR$, wherein R may be a hydrogen atom or an alkyl, cycloalkyl, aryl, or acyl group. In the stabilized materials prepared in accordance with the present invention, substantially all of the hydroxyl groups of the unstabilized polyoxymethylene have been converted to ester groups.

The process of the present invention provides a rapid and efficient means for converting monomeric formaldehyde or trioxane to high molecular weight polymers that have excellent heat stability. In addition the use of the present process for the formation and in situ stabilization of high molecular weight polyoxymethylene has the further advantage of bringing about an increase in the average chain length of the polymer molecules. This increase is believed to be the result of the reaction of two molecules of the polyoxymethylene with one molecule of the alkylene dicarboxylate to form a polymer of increased molecular weight whose terminal hydroxyl groups are subsequently esterified by reaction with an additional amount of the alkylene dicarboxylates. These reactions may be illustrated by the following equations in which

represents the alkylidene diester, R, R', and R" having the hereinafter defined significance:

(A)
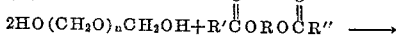

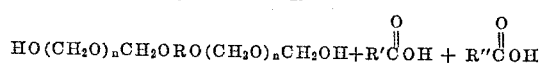

(B)

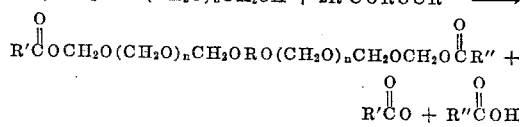

Unlike the stabilizers of the present invention those that have been used previously merely react with the terminal hydroxyl groups of the polyoxymethylene without effecting an increase in its molecular weight.

In the preferred embodiment of the invention, anhydrous monomeric formaldehyde is introduced into a reactor that contains an alkylene dicarboxylate and allowed to polymerize to high molecular weight partially acylated polyoxymethylene polyol. The reaction mixture is then heated to form a stabilized product.

The formaldehyde monomer that is used as the starting material in this process may be derived from any convenient source. For example, it may be obtained by the pyrolysis of paraformaldehyde, trioxane, $\alpha$-polyoxymethylene, or a hemiformal, such as cyclohexanol hemiformal. In order to obtain the desired tough, high molecular weight product, it is necessary that the formaldehyde monomer be substantially anhydrous, that is, that it contain less than 0.5% and preferably less than 0.1% by weight of water.

The alkylene dicarboxylates that may be used in the practice of this invention have the structural formula

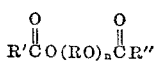

wherein R represents CH$_2$ or CH (CH$_3$), R' and R" each represents the residue of an ethylenically saturated monocarboxylic acid, and $n$ represents a number in the range of 1 to 3. The groups represented by R' and R", which may be the same or different groups, include alkyl groups containing from 1 to 18 carbon atoms, cycloalkyl groups, and aryl groups. Illustrative of these groups are methyl, ethyl, propyl, hexyl, octyl, 2-ethylhexyl, decyl, dodecyl, hexadecyl, octadecyl, cyclopentyl, cyclohexyl, phenyl, chlorophenyl, and hydroxyphenyl groups. The preferred diesters are those in which R represents a methylene group and R' and R" each represents an alkyl group containing from 1 to 3 carbon atoms, for example, methylene diacetate, methylene dipropionate, methylene dibutyrate, methylene acetate propionate, the low molecular weight polymeric analogs of these diesters, and mixtures thereof. Particularly preferred are methylene diacetate and mixtures containing approximately 50% to 90% of methylene diacetate and approximately 10% to 50% of its dimeric and trimeric analogs.

These alkylene dicarboxylates may be prepared by any convenient procedure. For example, approximately equimolar amounts of paraformaldehyde and the appropriate monocarboxylic acid anhydride or a mixture of such anhydrides may be reacted in the presence of an acidic catalyst, for example, zinc chloride, sulfuric acid, or phosphoric acid, and the product isolated by fractional distillation. It is generally advantageous to distill off a portion of the diester prior to its use in the present process to insure the absence of monocarboxylic acids which may inhibit the polymerization reaction.

The use of the alkylene dicarboxylates as the reaction medium in the process of the invention permits the polymerization reaction to occur under mild temperatures, at which polymerization temperatures these reaction mediums are liquid, they are inert to formaldehyde and to the polymerization initiator, and they do not dissolve the partially acylated polyoxymethylene polyol formed, whereas at the elevated temperatures at which the in situ stabilization is carried out they readily dissolve the high molecular weight partially acylated polyoxymethylene polyol to form esterified products that have excellent thermal stability.

The amount of the alkylene dicarboxylate present during the polymerization step is not critical but may be within the range of approximately 1 to 1000 parts by weight per part by weight of formaldehyde. In most cases approximately 1 to 100 parts of the diester is used for each part of formaldehyde.

The polymerization of formaldehyde may be effected in the presence or in the absence of a polymerization initiator. It is ordinarily preferred to carry out the polymerization in the presence of a polymerization initiator in the amount of approximately 0.00001 part to 0.05 part and preferably 0.0001 part to about 0.005 part by weight per part by weight of formaldehyde. Any of the well-known formaldehyde polymerization initiators may be used in this polymerization. These include metal salts, metal organic compounds, phosphines, arsines, stilbenes, amines, hydroxy polyamines, and the like. The preferred polymerization initiators are aliphatic amines, polyamines, and metal salts. Specific examples of the preferred initiators are tri-n-butylamine, tetraalkylalkylene diamines, and copper soaps.

The polymerization of formaldehyde to high molecular weight polyoxymethylene polyols may be carried out in any convenient manner. For example, anhydrous monomeric formaldehyde may be introduced into a reactor containing the alkylene dicarboxylate and the polymerization initiator. Alternatively, formaldehyde may be introduced into a reactor containing the alkylene dicarboxylate while at the same time the initiator is added at such a rate that the temperature of the reaction mixture is maintained within the desired range. The polymerization of formaldehyde to high molecular weight polyoxymethylene partially acylated polyoxymethylene polyol may be carried out as either a batchwise process or a continuous process.

The anhydrous monomeric formaldehyde is ordinarily introduced into the reactor through a gas inlet tube opening above the surface of the alkylene dicarboxylate so as to avoid plugging due to formation of polymer within the tube. The reaction mixture is stirred vigorously throughout the formaldehyde addition and polymerization step.

The polymerization of formaldehyde is generally accomplished at a temperature between approximately −100° C. and 80° C. and preferably between approximately −30° C. and 40° C. The particularly preferred polymerization temperature is approximately −25° C. to −10° C. While superatmospheric and subatmospheric pressures may be employed, the reaction in most cases takes place under atmospheric pressure.

The formation of tough, high molecular weight polyoxymethylene is best effected under non-oxidizing conditions. A convenient way of obtaining such conditions involves sweeping the reactor with a dry inert gas, such as nitrogen, and then polymerizing the formaldehyde under a blanket of the inert gas. In addition an antioxidant may be present during the reaction and/or may be added to the product to reduce oxidative effects. Among the antioxidants that are useful for this purpose are phenothiazine, 2-mercaptobenzimidazole, diphenylamine, phenyl-α-naphthylamine, bis (β-naphthylamino)-p-phenylenediamine, 4,4'-butylidene bis (3-methyl-6-tertiary butylphenol), and 5-ethyl-10,10-diphenylphenazasiline. The amount of antioxidant used is generally about 0.01% to about 1% based on the weight of the formaldehyde.

The polymerization of formaldehyde takes place rapidly and is generally considered to be complete as soon as all of the monomeric formaldehyde has been added. The reaction mixture, however, may be maintained at the polymerization temperature for a period ranging from several minutes to an hour or more before the stabilization step is begun.

Upon completion of the polymerization step, the reaction mixture which may contain a catalytic amount of an alkaline esterification catalyst is heated with stirring to a temperature at which the alkylene dicarboxylate will react with the terminal hydroxyl groups of the partially acylated polyoxymethylene polyol and maintained at that temperature until esterification of the remaining hydroxyl groups is complete. While temperatures as low as approximately 100° C. may be used, the esterification reaction is preferably carried out at a temperature in the range of approximately 140° C. to 200° C. If desired, somewhat higher temperatures may be used. It is particularly preferred that the esterification reaction take place at a temperature in the range of approximately 150° C. to 180° C. At temperatures in the preferred range, a reaction period of approximately 5 minutes to 3 hours is generally required.

The alkaline esterification catalysts that may be used in the stabilization step are preferably alkali metal salts of acids having dissociation constants of less than $1.8 \times 10^{-4}$ at 25° C. These salts include the sodium, potassium, lithium, rubidium, and cesium salts of a wide variety of organic and inorganic acids. Illustrative of these salts are the following: sodium formate, sodium acetate, sodium propionate, sodium laurate, sodium stearate, sodium benzoate, sodium salicylate, sodium carbonate, disodium phosphate, lithium acetate, lithium benzoate, potassium acetate, potassium benzoate, potassium carbonate, and the like.

The amount of the alkaline esterification catalyst that is used is not critical and ordinarily varies from approximately 0.001% to 1% based on the weight of the alkylidene diester. In most cases approximately 0.01% to 0.1% of the catalyst is present based on the weight of the alkylene dicarboxylate.

Following the stabilization step, the stabilized polyoxymethylene, which precipitates when the reaction mixture is cooled to room temperature, is isolated by well-known procedures, such as filtration.

It has been found to be desirable that the product recovered from the stabilization process be washed and dried as thoroughly as possible or otherwise treated to remove all of the reactants and by-products which might cause degradation of the product. This removal may be accomplished conveniently by washing the polymer with water or organic solvents, such as ketones, ethers, and hydrocarbons, and drying the recovered polymer or by other procedures known to those skilled in the art. For example, the filter cake which has been obtained by separating the polymer from the reaction mixture may be washed first with acetone, then with water, and finally with acetone. It is not intended that this invention should be limited to any particular method of removing impurities from the product since any of several well-known procedures may be used to accomplish this purpose. As has been indicated, the stabilized polyoxymethylene during or after washing may be treated with one of the aforementioned antioxidants.

The thermal stability of the product may be determined by measuring the weight loss of a one gram sample of the product on being heated at 222° C. for one hour. The stabilized polymers prepared in accordance with the process of the present invention have a thermal degradation rate at this temperature of less than 20% per hour, and preferably less than 10% per hour.

In addition to being valuable for the production of thermally-stable high molecular weight polyoxymethylene polycarboxylates, the present polymerization-stabilization procedure can also be used for the production of thermally-stable high molecular weight formaldehyde copolymers, and particularly of such copolymers that contain at least 60% and preferably 80% to 98% of oxymethylene units. These products may be obtained by polymerizing a mixture containing approximately 2 to 80 parts of a copolymerizable material per 100 parts of formaldehyde and stabilizing the resulting copolymer. A wide variety of copolymerizable materials may be used in this process including, for example, alkylene oxides, acetals of polyhydric alcohols, ethylenically saturated aliphatic or aromatic aldehydes, and mixtures thereof. Illustrative of these materials are ethylene oxide, propylene oxide, butylene oxide, 1,3-dioxalane, neopentyl glycol formals, pentaerythritol acetals, glycerol acetals, trimethylolethane acetals, trimethylolpropane acetals, sorbitol acetals, acetaldehyde, propionaldehyde, benzaldehyde, and the like. The conditions under which the copolymerization and the subsequent stabilization of the copolymer are accomplished are similar to those set forth herein in connection with the preparation and stabilization of high molecular weight homopolymeric polyoxymethylene polycarboxylates.

The following examples will illustrate the manner in which this invention may be practiced. It is to be understood, however, that these examples are not to be construed as being limitative, but are furnished merely for purposes of illustration.

Example 1

Anhydrous monomeric formaldehyde was prepared by heating a suspension of 100 grams of α-polyoxymethylene in 400 ml. of mineral oil at 117°–150° C. The formaldehyde vapors from this pyrolysis were passed through a series of traps, the first of which was maintained at room temperature, the second at 0° C., and the third and fourth at −15° to −20° C. The resulting purified anhydrous monomeric formaldehyde was introduced along with a stream of dry nitrogen into a reactor that contained 400 ml. of methylene diacetate and 0.1 gram of phenothiazine. The reaction mixture was stirred vigorously during the addition of the formaldehyde which took place over a period of 80 minutes. The reaction medium was maintained at a temperature between −20° C. and −25° C. during the addition of the formaldehyde. When all of the formaldehyde had been added, 0.4 gram of anhydrous sodium acetate was added to the reaction mixture. This mixture was then stirred and heated gradually to 160°–170° C., maintained at that temperature for 1 hour, cooled to room temperature, and filtered. The resulting stabilized polyoxymethylene was washed with 500 ml. of acetone, with two 500 ml. portions of water, and finally with an additional two 500 ml. portions of acetone, the second of which contained 0.1 gram of phenothiazine. After drying under vacuum at 65° C. to constant weight, the product, which weighed 32.4 grams, could be compression molded, for example, at 180°–190° C. under 900–1000 p.s.i. pressure to produce tough, translucent films. The thermal degradation rate of the product at 222° C. was 1.57% per hour. The inherent viscosity of a 0.5% solution of the product in dimethylformamide which contained 1% of diphenylamine was 0.60 at 150° C., which indicated that the stabilized product had an average molecular weight of approximately 30,000.

Example 2

A mixture of 560 grams of methylene diacetate, 0.1 gram of phenothiazine, and 0.1 gram of tri-n-butylamine was heated in a reactor to distill off 157 grams of methylene diacetate and then cooled to −25° C. To the reactor was then added anhydrous monomeric formaldehyde obtained by heating at 120°–150° C. a suspension of 100 grams of α-polyoxymethylene in 336 grams of paraffin oil and passing the resulting vapors through a series of traps, the first of which was maintained at room temperature, the second at 0° C., and the third and fourth at −20° to −25° C. The reaction mixture was stirred vigorously during the addition of the monomeric formaldehyde which took place over a period of 1 hour. The reaction medium was maintained at a temperature of −20° to −25° C. during the addition of the formaldehyde. When all of the formaldehyde had been added, 0.4 gram of anhydrous sodium acetate was added to the reaction mixture. This mixture was then stirred and heated gradually to 160°–170° C., maintained at that temperature for 1 hour, cooled to room temperature, and filtered. The crude product was washed with 500 ml. of acetone, with two 500 ml. portions of water, and finally with an additional two 500 ml. portions of acetone, the second of which contained 0.1 gram of 4,4′-butylidene bis (3-methyl-6-tert. butylphenol). The product was dried under vacuum at 65° C. to constant weight. The resulting stabilized polyoxymethylene, which weighed 57.4 grams, could be compression molded to produce tough, translucent films. The thermal degradation rate of the product at 222° C. was 4.7% per hour.

The methylene diacetate that was distilled from the reaction mixture prior to the polymerization of the formaldehyde was combined with the methylene diacetate obtained as the filtrate from the filtration of the polyoxymethylene and the acetone recovered from the washing steps. The mixture was distilled at atmospheric pressure to remove acetone from it and then at 40°–110° C. at 20 mm. There was recovered 94.3% of the methylene diacetate originally charged to the reactor.

Example 3

Anhydrous monomeric formaldehyde was prepared by heating a suspension of 100 grams of α-polyoxymethylene in 400 grams of mineral oil at 117°–150° C. The formaldehyde vapors from this pyrolysis were passed through a series of traps, the first of which was maintained at room temperature, the second at 0° C., and the third and fourth at —15° to —20° C. The anhydrous monomeric formaldehyde was introduced along with a stream of dry nitrogen into a reactor that contained 400 ml. of methylene diacetate, 0.1 gram of phenothiazine, and 0.4 gram of anhydrous potassium acetate. The reaction mixture was stirred vigorously during the addition of the formaldehyde which took place over a period of 80 minutes. The reaction medium was maintained at —20° to —25° C. during the addition of the formaldehyde. When all of the formaldehyde had been added to it, the reaction mixture was stirred and heated gradually to 160°–170° C., maintained at that temperature for 30 minutes, cooled to room temperature, and filtered. The resulting stabilized polyoxymethylene was washed and dried by the procedure described in Example 1. The product, which weighed 28.3 grams, could be compression molded to produce tough, translucent films. The thermal degradation rate of the product at 222° C. was 1.15% per hour. The inherent viscosity of a 0.5% solution of the product in dimethylformamide which contained 1% of diphenylamine was 0.60 at 150° C.

Example 4

A mixture of 560 grams of methylene diacetate, 0.1 gram of phenothiazine, and 0.1 gram of copper naphthenate was heated in a reactor to distill off 120 grams of methylene diacetate and then cooled to —25° C. To the reactor was then added anhydrous monomeric formaldehyde obtained by pyrolyzing 100 grams of α-polyoxymethylene and passing the resulting vapors through the series of traps described in Example 2. The reaction mixture was stirred vigorously during the addition of the formaldehyde which took place over a period of 1 hour. The reaction medium was maintained at —20° to —25° C. during the addition of the formaldehyde. Then after the addition of 0.4 gram of anhydrous sodium benzoate the reaction mixture was stirred and heated gradually to 160°–170° C., maintained at that temperature for 90 minutes, cooled to room temperature, and filtered. The resulting stabilized polyoxymethylene was washed and dried by the procedure described in Example 1. The product, which weighed 36.7 grams, could be compression molded to produce tough, translucent films. The thermal degradation rate of the product at 222° C. was 6.5% per hour. The inherent viscosity of a 0.5% solution of the product in dimethylformamide which contained 1% of diphenylamine was 0.502 at 150° C.

Example 5

Anhydrous monomeric formaldehyde was prepared by heating a suspension of 100 grams of α-polyoxymethylene in 400 ml. of paraffin oil at 121°–150° C. The formaldehyde vapors from this pyrolysis were passed through a series of traps, the first of which was maintained at room temperature, the second at 0° C., and the third and fourth at —15° to —20° C. The resulting anhydrous monomeric formaldehyde was introduced along with a stream of dry nitrogen into a reactor which contained 1500 ml. of anhydrous hexane, 0.1 gram of N,N,N',N'-tetramethylethylene diamine, and 0.1 gram of phenothiazine. The reaction mixture was stirred vigorously during the addition of the formaldehyde which took place over a period of 2 hours. The reaction medium was maintained at 25°–30° C. during the addition of the formaldehyde. As soon as all of the formaldehyde had been added, the reaction mixture was filtered. The resulting polyoxymethylene after washing with cyclohexane and drying under vacuum at 65° C. to constant weight weighed 61.5 grams.

Ten grams of this high molecular weight polyoxymethylene was added to a mixture containing 150 grams of methylene diacetate and 0.1 gram of anhydrous sodium acetate. The reaction mixture was stirred and heated at 150°–160° C. for 90 minutes and then cooled to room temperature and filtered. The resulting stabilized polyoxymethylene was washed and dried by the procedure described in Example 1. The product, which weighed 6.2 grams, had a thermal degradation rate at 222° C. of 7.3% per hour and an inherent viscosity of 0.74 measured under the conditions of Example 4.

Example 6

A mixture of 130 ml. of methylene diacetate and 0.1 gram of 4,4'-butylidene bis (3-methyl-6-tert. butylphenol) was heated in a reactor to distill off 30 ml. of methylene diacetate and then cooled to room temperature. After the addition of 100 grams of trioxane which contained 0.02% of water, the reaction mixture was heated to 130° C. to dissolve the trioxane and then cooled to 30° C. To the reaction mixture was added 0.125 ml. of boron trifluoride etherate. The reaction mixture was stirred at 30°–40° C. for 90 minutes after which time 200 ml. of methylene diacetate, 0.7 gram of anhydrous sodium acetate, and 0.1 gram of tri-n-butylamine were added to it. The reaction mixture was then heated with stirring to 160° C., maintained at 160°–170° C. for 1 hour, cooled to room temperature, and filtered. The resulting stabilized polyoxymethylene was washed and dried by the procedure described in Example 1. The product, which weighed 80.4 grams, could be compression molded to produce tough, translucent films. The thermal degradation rate of the product at 222° C. was 0.57% per hour.

Example 7

A mixture of 560 grams of methylene diacetate, 0.1 gram of phenothiazine, and 0.1 gram of tri-n-butylamine was heated in a reactor to distill off 120 grams of methylene diacetate and then cooled to —25° C. To the reactor was then added anhydrous monomeric formaldehyde obtained by pyrolyzing 100 grams of α-polyoxymethylene and passing the resulting vapors through the series of traps described in Example 2. The reaction mixture was stirred vigorously during the addition of the formaldehyde which took place over a period of 1 hour. The reaction medium was maintained at —20° to —25° C. during the addition of the formaldehyde. Then after the addition of 0.4 gram of anhydrous sodium propionate the reaction mixture was stirred and heated gradually to 160°–170° C., maintained at that temperature for 90 minutes, cooled to room temperature, and filtered. The resulting stabilized polyoxymethylene was washed and dried by the procedure described in Example 1. The product, which weighed 50 grams, had a thermal degradation rate at 222° C. of 4.45% per hour and an inherent viscosity (0.5% solution in dimethylformamide containing 1% of diphenylamine) of 0.612 at 150° C.

Example 8

A mixture of 20 grams of paraformaldehyde, 224 grams of methylene diacetate, and 0.2 gram of anhydrous sodium acetate was heated gradually to 160°–170° C., maintained at that temperature for 1 hour, cooled to room temperature, and filtered. The resulting product was washed with 50 ml. of acetone, with two 50 ml. portions of water, and finally with an additional two 50 ml. portions of acetone, the second of which contained 0.1 gram of phenothiazine. It was then dried to constant weight at 65° C. under vacuum to yield 2 grams of stabilized high molecular weight polyoxymethylene. This product had a thermal degradation rate at 222° C. of 0.73% per hour.

Example 9

A mixture of 524 grams of methylene dipropionate and 0.1 gram of phenothiazine was heated in a reactor to distill off 105 grams of methylene dipropionate and then cooled to —25° C. To the reactor was then added anhydrous monomeric formaldehyde obtained by heating at 120°–150° C. a suspension of 100 grams of α-polyoxymethylene in 330 grams of mineral oil and passing the resulting vapors through the series of traps described in Example 1. The addition of formaldehyde took place over a period of 80 minutes during which time the reaction medium was maintained at a temperature between —20° C. and —25° C. Then after the addition of 0.4 gram of anhydrous sodium acetate, the mixture was stirred and heated gradually to 160°–170° C., maintained at that temperature for 1 hour, cooled to room temperature, and filtered. The resulting stabilized polyoxymethylene was washed and dried by the procedure described in Example 1. The product, which weighed 18.8 grams, had a thermal degradation rate at 222° C. of 9.0% per hour and an inherent viscosity (0.5% solution in dimethylformamide containing 1% of diphenylamine) of 0.612 at 150° C.

*Example 10*

To ethylidene diacetate obtained by heating a 500 gram portion of ethylidene diacetate until 100 grams of it had been distilled off were added 0.1 gram of phenothiazine and 0.1 gram of tri-n-butylamine. This mixture was then cooled to 20° C. To the reactor was added anhydrous monomeric formaldehyde obtained by heating at 120°–150° C. a suspension of 100 grams of α-polyoxymethylene in 360 grams of mineral oil and passing the resulting vapors through the series of traps described in Example 1. The addition of formaldehyde took place over a period of 68 minutes during which time the reaction medium was maintained at a temperature between 25° C. and 30° C. Then after the addition of 0.4 gram of anhydrous sodium acetate, the mixture was stirred and heated at 160°–170° C. for 1 hour, cooled to room temperature, and filtered. The resulting stabilized polyoxymethylene was washed and dried by the procedure described in Example 1. The product, which weighed 29.7 grams, had good thermal stability.

*Example 11*

A mixture of 560 grams of methylene diacetate and 0.1 gram of phenothiazine was heated in a reactor to distill off 120 grams of methylene diacetate and then cooled to —25° C. To this mixture was added first 3.0 grams of ethylene oxide and 0.1 gram of tri-n-butylamine and then anhydrous monomeric formaldehyde obtained by heating at 120°–150° C. a suspension of 100 grams of α-polyoxymethylene in 300 grams of mineral oil and passing the resulting vapors through the series of traps described in Example 1. The addition of formaldehyde took place over a period of 1 hour during which time the reaction medium was maintained at a temperature between —20° C. and —25° C. Then after the addition of 0.4 gram of anhydrous sodium benzoate, the reaction mixture was heated at 160°–170° C. for 1 hour, cooled to room temperature, and filtered. The resulting stabilized copolymer was washed and dried by the procedure described in Example 1. The product, which weighed 48.6 grams, had a thermal degradation rate at 222° C. of 7.15% per hour and an inherent viscosity of 0.922 measured under the conditions of Example 4.

*Example 12*

A mixture of 560 grams of methylene diacetate, 3.0 grams of pentaerythritol diformal, and 0.1 gram of 4,4'-butylidene bis (3-methyl-6-tert. butylphenol) was heated in a reactor to distill off 120 grams of methylene diacetate and then cooled to —25° C. To the reactor was then added anhydrous monomeric formaldehyde obtained by heating at 120°–150° C. a suspension of 100 grams of α-polyoxymethylene in 360 grams of mineral oil and passing the resulting vapors through the series of traps described in Example 1. The addition of formaldehyde took place over a period of 1 hour during which time the reaction medium was maintained at a temperature between —20° C. and —25° C. Then after the addition of 0.4 gram of anhydrous potassium benzoate, the reaction mixture was heated at 160°–170° C. for 1 hour, cooled to room temperature, and filtered. The resulting stabilized copolymer was washed and dried by the procedure described in Example 1. The product, which weighed 54.8 grams, had a thermal degradation rate at 222° C. of 9.9% per hour and an inherent viscosity of 0.752 measured under the conditions of Example 4.

The stabilized high molecular weight polyoxymethylene compositions of the present invention may if desired contain plasticizers, fillers, pigments, solvents, antioxidants and other stabilizers, such as stabilizers against degradation caused by ultraviolet light. They may also contain other polymeric materials, for example, urea-formaldehyde resins, phenol-formaldehyde resins, vinyl resins, and the like.

The polyoxymethylenes produced by the process of this invention possess a very high molecular weight, have excellent thermal stability, are orientable by drawing, and are useful in many applications. They may be converted by melt extrusion, injection molding, compression molding, and other fabrication methods to films, fibers, molded articles, and the like.

What is claimed is:

1. The process for the production of high molecular weight polymers of formaldehyde which comprises contacting a formaldehyde source selected from the group consisting of monomeric formaldehyde and trioxane with a polymerization initiator in the presence of an alkylene dicarboxylate having a structure represented by the formula $$R'-\underset{\underset{O}{\|}}{C}-O-(RO)_n-\underset{\underset{O}{\|}}{C}-R''$$

in which R is a divalent substituent selected from the group consisting of —$CH_2$— and —$CH(CH_3)$—, R' and R" each represent substituents selected from the group consisting of alkyl groups having from 1 to 18 carbon atoms, cycloalkyl groups, and aryl groups, and $n$ is an integer from 1 to 3, at a temperature in the range from about —100° C. and 80° C. under substantially anhydrous conditions, thereby forming a high molecular weight polymer of formaldehyde.

2. The process for the production of high molecular weight polymers of formaldehyde which comprises contacting substantially anhydrous monomeric formaldehyde with a polymerization initiator in the presence of from about 1 to about 1000 parts by weight, per part of monomeric formaldehyde, of an alkylene dicarboxylate having a structure represented by the formula $$R'-\underset{\underset{O}{\|}}{C}-O-(RO)_n-\underset{\underset{O}{\|}}{C}-R''$$

in which R is a divalent substituent selected from the group consisting of —$CH_2$— and —$CH(CH_3)$—, R' and R" each represent substituents selected from the group consisting of alkyl groups having from 1 to 18 carbon atoms, cycloalkyl groups, and aryl groups, and $n$ is an integer from 1 to 3, at a temperature in the range from about —100° C. to about 80° C. under substantially anhydrous conditions, thereby forming a partially acylated branched chain polyoxymethylene polyol.

3. The process for the production of thermally stable high molecular weight polymers of formaldehyde which comprises (a) contacting substantially anhydrous monomeric formaldehyde with a polymerization initiator in the presence of from about 1 to about 1000 parts by weight, per part of monomeric formaldehyde, of an alkylene dicarboxylate having a structure represented by the formula $$R'-\underset{\underset{O}{\|}}{C}-O-(RO)_n-\underset{\underset{O}{\|}}{C}-R''$$

in which R is a divalent substituent selected from the group consisting of —CH$_2$— and —CH(CH$_3$)—, R' and R" each represent substituents selected from the group consisting of alkyl groups having from 1 to 18 carbon atoms, cycloalkyl groups, and aryl groups, and $n$ is an integer from 1 to 3, at a temperature in the range from about —100° C. to about 80° C. under substantially anhydrous conditions, thereby forming a suspension in the alkylene dicarboxylate of a partially acylated branched chain polyoxymethylene polyol, and (b) heating the resultant suspension to a temperature in the range from about 140° C. to about 200° C. to substantially completely esterify the polymer in situ in the alkylene dicarboxylate reaction medium, thereby forming a thermally stable branched chain polyoxymethylene polycarboxylate.

4. The process for the production of thermally stable high molecular weight polymers of formaldehyde which comprises (a) contacting substantially anhydrous monomeric formaldehyde with a polymerization initiator in the presence of from about 1 to about 1000 parts by weight per part of monomeric formaldehyde, of methylene diacetate, at a temperature in the range from about —100° C. to about 80° C. under substantially anhydrous conditions, thereby forming a suspension in methylene diacetate of a partially acetylated branched chain polyoxymethylene polyol, and (b) heating the resultant suspension to a temperature in the range from about 140 °C. to about 200° C. in the presence of an alkaline esterification catalyst to substantially completely acetylate the polymer in situ in the methylene diacetate reaction medium, thereby forming a thermally stable branched chain polyoxymethylene polyacetate.

5. The process for the production of thermally stable high molecular weight polymers of formaldehyde in accordance with claim 4, in which a small amount of an antioxidant is incorporated in the methylene diacetate reaction medium.

6. The process for the production of thermally stable high molecular weight polymers of formaldehyde in accordance with claim 4, in which the partially acetylated polyoxymethylene polyol is substantially completely acetylated in situ in the methylene diacetate reaction medium by adding acetic anhydride to the reaction medium.

7. The process for the production of high molecular weight copolymers of formaldehyde which comprises contacting a formaldehyde source selected from the group consisting of monomeric formaldehyde and trioxane and at least one comonomer of the group consisting of alkylene oxides, acetals of polyhydroxy alcohols, aldehydes, and mixtures thereof, with a polymerization initiator in the presence of an alkylene dicarboxylate having a structure represented by the formula

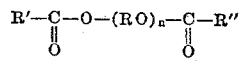

in which R is a divalent substituent selected from the group consisting of —CH$_2$— and —CH(CH$_3$)—, R' and R" each represent substituents selected from the group consisting of alkyl groups having from 1 to 18 carbon atoms, cycloalkyl groups, and aryl groups, and $n$ is an integer from 1 to 3, at a temperature in the range from about —100° C. and 80° C. under substantially anhydrous conditions, thereby forming a high molecular weight copolymer having recurring oxymethylene groups interspersed with recurring groups derived from the comonomer.

References Cited by the Examiner
UNITED STATES PATENTS

| | | | |
|---|---|---|---|
| 2,964,500 | 12/1960 | Jenkins et al. | 260—45.95 |
| 2,989,511 | 6/1961 | Schnizer | 260—67 |
| 2,998,409 | 8/1961 | Nogare et al. | 260—67 |
| 3,046,251 | 7/1962 | Wagner | 260—67 |
| 3,054,775 | 9/1962 | Hodes et al. | 260—67 |

LEON J. BERCOVITZ, *Primary Examiner.*

M. STERMAN, WILLIAM H. SHORT, *Examiners.*